US 9,769,394 B2

(12) United States Patent
Kutsuma et al.

(10) Patent No.: US 9,769,394 B2
(45) Date of Patent: Sep. 19, 2017

(54) IMAGE PICKUP APPARATUS, IMAGE PROCESSING APPARATUS, AND COMPUTER-READABLE STORAGE DEVICE

(71) Applicant: OLYMPUS CORPORATION, Tokyo (JP)

(72) Inventors: Yuji Kutsuma, Kokubunji (JP); Kazuma Kaneko, Hachioji (JP); Tomoki Iwasaki, Fuchu (JP); Susumu Hashimoto, Hachioji (JP); Soichiro Koshika, Mitaka (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/162,969

(22) Filed: May 24, 2016

(65) Prior Publication Data

US 2016/0269611 A1      Sep. 15, 2016

Related U.S. Application Data

(63) Continuation of application No. PCT/JP2014/081831, filed on Dec. 2, 2014.

(30) Foreign Application Priority Data

Dec. 5, 2013  (JP) .................. 2013-252143

(51) Int. Cl.
*H04N 5/235*   (2006.01)
*H04N 5/347*   (2011.01)
*H04N 5/367*   (2011.01)

(52) U.S. Cl.
CPC ......... *H04N 5/2354* (2013.01); *H04N 5/2351* (2013.01); *H04N 5/347* (2013.01); *H04N 5/367* (2013.01)

(58) Field of Classification Search
CPC .................................................... H04N 5/2354
(Continued)

(56) References Cited

U.S. PATENT DOCUMENTS

2009/0123085 A1   5/2009   Yoshimura et al.
2010/0123806 A1   5/2010   Li et al.
(Continued)

FOREIGN PATENT DOCUMENTS

EP   2 656 774 A1   10/2013
JP   2008-72501 A   3/2008
(Continued)

OTHER PUBLICATIONS

International Search Report dated Mar. 17, 2015 issued in PCT/JP2014/081831.
(Continued)

*Primary Examiner* — Dave Czekaj
*Assistant Examiner* — Shanika Brumfield
(74) *Attorney, Agent, or Firm* — Scully, Scott, Murphy & Presser, P.C.

(57) ABSTRACT

An image pickup apparatus includes an endoscope configured to have an image pickup section in which a plurality of pixels are provided, and a storage section configured to store scope individual information, a binning processing section configured to split an image into a plurality of regions so that one region includes a plurality of pixel signals, and add up the pixel signals for each region to obtain a binning pixel signal, a binning brightness detection section configured to detect brightness of the region, a blend processing section configured to set a weight in the region on the basis of the brightness, and weight and composite the pixel signals and the binning pixel signal to generate a composite image, and
(Continued)

a control section configured to control the binning processing section in accordance with the scope individual information.

8 Claims, 10 Drawing Sheets

(58) Field of Classification Search
    USPC .......................................................... 348/68
    See application file for complete search history.

(56) References Cited

U.S. PATENT DOCUMENTS

| | | | | |
|---|---|---|---|---|
| 2010/0208105 | A1* | 8/2010 | Kubota | H04N 5/23219 348/234 |
| 2014/0184769 | A1* | 7/2014 | Ishihara | A61B 1/00009 348/68 |

FOREIGN PATENT DOCUMENTS

| | | | |
|---|---|---|---|
| JP | 2008072501 A | * | 3/2008 |
| JP | 2009-118338 A | | 5/2009 |
| JP | 2010-193098 A | | 9/2010 |
| JP | 2013-56001 A | | 3/2013 |
| JP | 2013-119011 A | | 6/2013 |
| WO | WO 2012/169270 A1 | | 12/2012 |
| WO | WO 2013/035738 A1 | | 3/2013 |

OTHER PUBLICATIONS

Japanese Office Action dated Sep. 14, 2015 issued in JP 2015-530807.

Extended Supplementary European Search Report dated Jul. 4, 2017 in European Patent Application No. 14 86 7993.9.

* cited by examiner

| BRIGHTNESS OF REGION | α |
|---|---|
| BRIGHT | LARGE |
| ↕ | ↕ |
| DARK | SMALL |

| PIXEL (2n+1, 2m+1)<br>PIXEL VALUE: a<br>WEIGHT: x | PIXEL (2n+1, 2m+2)<br>PIXEL VALUE: b<br>WEIGHT: y |
|---|---|
| PIXEL (2n+2, 2m+1)<br>PIXEL VALUE: c<br>WEIGHT: z | PIXEL (2n+2, 2m+2)<br>PIXEL VALUE: d<br>WEIGHT: t |

| BINNING | NOISE REDUCTION | ENHANCEMENT |
|---------|-----------------|-------------|
| ON      | WEAK            | STRONG      |
| OFF     | NORMAL          | NORMAL      |

| APPLICATION SITE | IMAGE PICKUP DEVICE BINNING | IMAGE PROCESSING BINNING |
|---|---|---|
| LUNG | REQUIRED WHEN APPROPRIATE | UNNECESSARY |
| STOMACH | ESSENTIAL | REQUIRED WHEN APPROPRIATE |

| IMAGE PICKUP DEVICE BINNING | IMAGE PROCESSING BINNING | DETECTION REGION SIZE OF BRIGHTNESS DETECTION SECTION |
|---|---|---|
| ON | ON | CHANGE |
| ON | OFF | CHANGE |
| OFF | ON | CHANGE |
| OFF | OFF | DO NOT CHANGE |

IMAGE PICKUP APPARATUS, IMAGE PROCESSING APPARATUS, AND COMPUTER-READABLE STORAGE DEVICE

CROSS REFERENCE TO RELATED APPLICATION

This application is a continuation application of PCT/JP2014/081831 filed on Dec. 2, 2014 and claims benefit of Japanese Application No. 2013-252143 filed in Japan on Dec. 5, 2013, the entire contents of which are incorporated herein by this reference.

BACKGROUND OF INVENTION

1. Field of the Invention

The present invention relates to an image pickup apparatus that performs binning processing of obtaining a binning pixel signal by adding up pixel signals.

2. Description of the Related Art

Since image pickup devices of recent years have been increased in the number of pixels and highly densified, and in particular, an image pickup device that is adopted in an electronic endoscope system is also downsized, an area of one pixel has become small, and it is sometimes difficult to ensure brightness of an image sufficiently.

In relation to this, as an art of increasing brightness of an image, an art called binning is proposed, which obtains a pixel value corresponding to one pixel by adding up pixel values obtained from a plurality of adjacent pixels.

For example, Japanese Patent Application Laid-Open Publication No. 2008-72501 describes the art of adding (simple addition, or ratio addition which multiplies peripheral pixels by a ratio of equal to or less than one and adding the peripheral pixels) peripheral pixels having the same color to an pixel of interest, with respect to a video signal that is outputted from an image pickup device and converted into a digital signal. The Publication further describes the art of changing the number of added pixels that is the number of the pixel of interest and peripheral pixels which are targets to be added in accordance with a luminance distribution.

More specifically, in order to reduce a whiteout or black crushing of an image plane, the pixel addition method described in the publication splits an image into a plurality of regions and detects the brightness of the pixel of interest in each of the respective regions, and determines the number of added pixels in binning processing on the basis of the detection result of the brightness, and when the luminance of a region is a predetermined threshold value or more at this time, pixel addition processing is not performed (that is, only the pixel of interest is used).

SUMMARY OF THE INVENTION

An image pickup apparatus according to a certain aspect of the present invention includes an endoscope configured to have an image pickup section in which a plurality of photoelectric conversion pixels that photoelectrically convert light to generate photoelectric conversion pixel signals are two-dimensionally provided, and an individual information storage section configured to store scope individual information, a binning processing section configured to split an image configured by a plurality of pixel signals into a plurality of regions so that one region includes the pixel signals in plurality, and add up the pixel signals in plurality which belong to the region to obtain a binning pixel signal, a binning brightness detection section configured to detect brightness of the region, a compositing section configured to set a weight in the region on the basis of the brightness which is detected by the binning brightness detection section, and generate a composite image by compositing the pixel signals and the binning pixel signal in the region on the basis of the weigh, and a control section configured to control the binning processing section in accordance with the scope individual information.

DETAILED DESCRIPTION OF THE PREFERRED EMBODIMENT(S)

Hereinafter, an embodiment of the present invention will be described with reference to the drawings.

Embodiment 1

Figure 1:
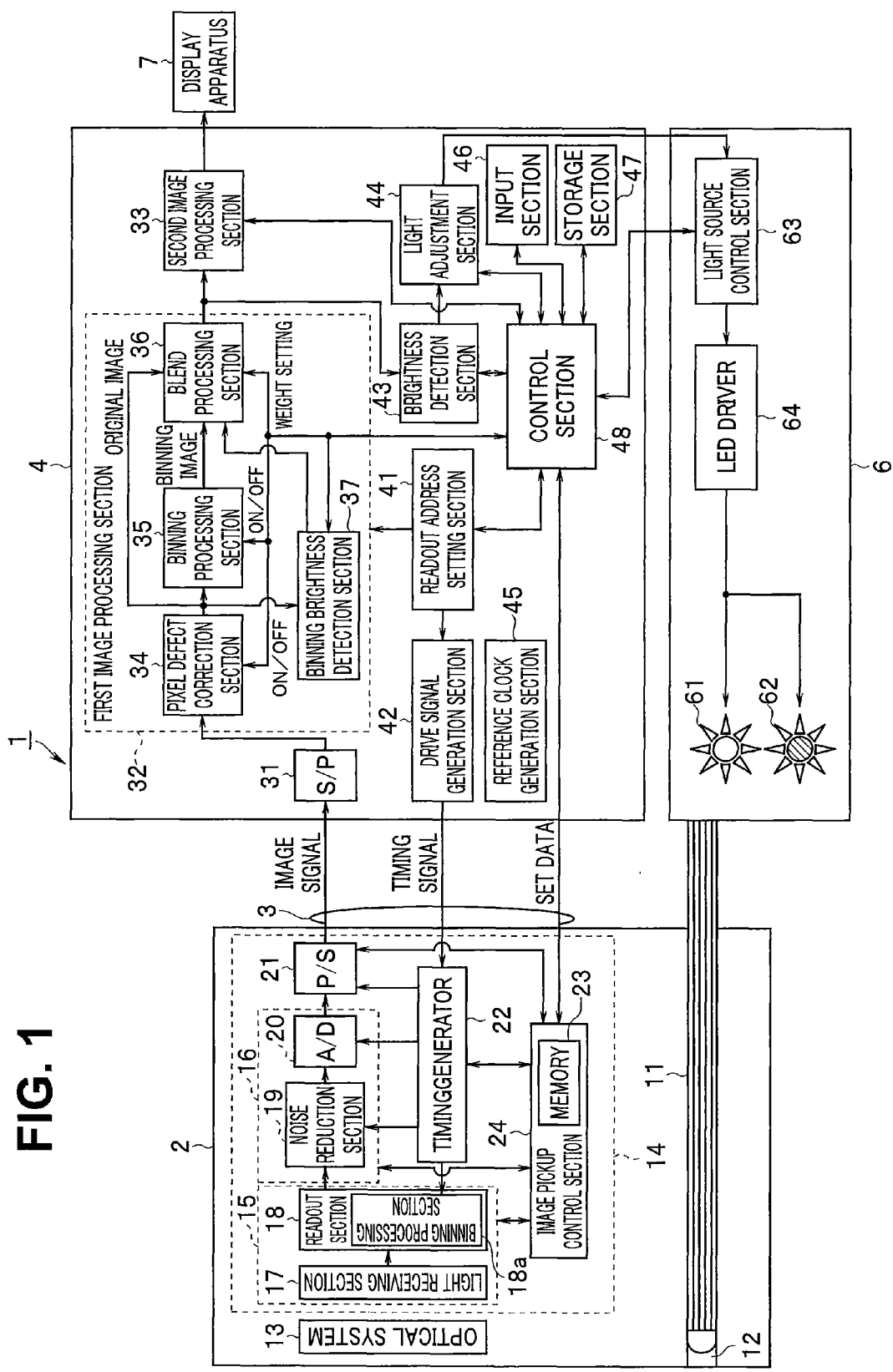
FIG. 1 is a block diagram showing a configuration of an endoscope system to which an image pickup apparatus in embodiment 1 of the present invention is applied.

FIG. 1 to FIG. 17 show embodiment 1 of the present invention, and FIG. 1 is a block diagram showing a configuration of an endoscope system to which an image pickup apparatus is applied.

An endoscope system 1 includes an endoscope 2 configured to pick up an image by an insertion portion being inserted into a subject, a collecting cable 3 placed together with a light guide 11 described later in a universal cable provided extensively from the endoscope 2 to a hand side, an image processing apparatus 4 to which a proximal end side of the collecting cable 3 is connected, and which is configured to apply image processing to an image that is acquired by the endoscope 2 and generally control an operation of the entire endoscope system 1, a light source apparatus 6 that is a light source section configured to generate illuminating light which is emitted from a distal end of the endoscope 2, and a display apparatus 7 configured to display an image processed by the image processing apparatus 4.

The endoscope 2 includes the light guide 11, an illumination optical system 12, an optical system 13 and an image pickup section 14.

The light guide 11 is configured to receive a light generated from the light source apparatus 6, in a proximal end side, and transmit the light to a distal end portion of the insertion portion of the endoscope 2, and is configured by an optical fiber bundle or the like.

The illumination optical system 12 is placed in a distal end of the light guide 11, and emits illuminating light transmitted by the light guide 11 toward a subject.

The optical system 13 is an objective optical system configured to receive light from the subject and form an optical image of the subject in an image pickup device 15 which will be described later of the image pickup section 14.

The image pickup section 14 photoelectrically converts the optical image of the subject which is formed by the optical system 13 and outputs the optical image as an image signal.

The image pickup section 14 includes the image pickup device 15, an analog front end section 16, a P/S conversion section 21, a timing generator 22, and an image pickup control section 24.

The image pickup device 15 has a light receiving section 17 and a readout section 18, and is configured as a CMOS (complementary metal oxide semiconductor) image sensor, or a CCD (charge coupled device) image sensor, for example.

In the light receiving section 17, a plurality of photoelectric conversion pixels (hereinafter, appropriately abbreviated as "pixels") that photoelectrically convert light to generate photoelectric conversion pixel signals are provided two-dimensionally. More specifically, the photoelectric conversion pixel is configured by including a photodiode that accumulates electric charges corresponding to a light amount, and an amplifier that amplifies the electric charges accumulated by the photodiode. Further, in the light receiving section 17, an RGB color filter of a Bayer array, or a complementary color filter, for example, is provided, so that a color image can be acquired. Note that a frame-sequential method may be adopted, that acquires a color image by compositing RGB images that are picked up with illuminating lights of RGB that are sequentially emitted on a time-series basis, without providing a color filter in the light receiving section 17.

The readout section 18 reads photoelectric conversion pixel signals from a plurality of pixels arranged in the light receiving section 17. Since one pixel generates one photoelectric conversion pixel signal in image pickup of one time (for example, image pickup of one frame), an image signal which is read by the readout section 18 is configured by a plurality of photoelectric conversion pixel signals. The readout section 18 further performs a function as a binning processing section 18a (an image pickup device binning processing section) that performs binning processing of photoelectric conversion pixel signals in the image pickup section 14 in accordance with necessity, on the basis of control of the image pickup control section 24. That is, the readout section 18 can function as the binning processing section 18a that performs binning processing of splitting an image configured by a plurality of pixel signals that are read from the light receiving section 17 into a plurality of regions so that one region includes a plurality of pixel signals, and adding up the plurality of pixel signals belonging to the region to obtain a binning pixel signal.

The analog front end section 16 has a noise reduction section 19 and an A/D conversion section 20.

The noise reduction section 19 reduces noise from photoelectric conversion pixel signals by performing correlated double sampling (correlated double sampling), for example.

The A/D conversion section 20 performs A/D conversion of analog photoelectric conversion pixel signals with noise reduced by the noise reduction section 19 to output digital signals.

The P/S conversion section 21 performs parallel/serial conversion of the parallel digital signals outputted from the analog front end section 16, and outputs the signals as serial signals.

The timing generator 22 generates a drive timing pulse for driving the image pickup device 15, and pulses for various kinds of signal processing in the analog front end section 16 and the P/S conversion section 21, on the basis of a timing signal received from the image processing apparatus 4.

The image pickup control section 24 performs communication with a control section 48 that will be described later of the image processing apparatus 4, and controls various operations of the endoscope 2 in accordance with set data received from the control section 48. The image pickup control section 24 further includes a memory 23 that stores scope individual information in a non-volatile manner. The scope individual information which the memory 23 stores includes information indicating a model name and an individual production serial number of the endoscope 2, a pixel number that is the number of photoelectric conversion pixels provided in the image pickup section 14, a pixel position information (a defective pixel address) of a defective pixel which has a defect in photoelectric conversion pixels, dark current noise information (fixed pattern noise information) of the image pickup device 15, information determining whether the image pickup device 15 is a CMOS image sensor or a CCD image sensor, information of the color filter provided in the light receiving section 17 of the image pickup device 15 (whether an RGB filter, a complimentary color filter, or no color filter is provided) and the like.

The collecting cable 3 is a cable where a plurality of signal lines that perform transmission and reception of electric signals between the endoscope 2 and the image processing apparatus 4 are bundled. The plurality of signal lines include a signal line that transmits an image signal outputted by the image pickup section 14 to the image processing apparatus 4, a signal line that transmits a timing signal outputted by a drive signal generation section 42 that will be described later of the image processing apparatus 4 to the timing generator 22 of the endoscope 2, a signal line that transmits set data outputted by the control section 48 of the image processing apparatus 4 to the image pickup control section 24, and the like. The collecting cable 3 is integrally configured as the universal cable, for example, together with the aforementioned light guide 11.

The image processing apparatus 4 includes an S/P conversion section 31, a first image processing section 32, a second image processing section 33, a readout address setting section 41, the drive signal generation section 42, a brightness detection section 43, a light adjustment section 44, a reference clock generation section 45, an input section 46, a storage section 47, and the control section 48.

The S/P conversion section 31 performs serial/parallel conversion of a digital image signal which the S/P conversion section 31 receives from the endoscope 2 by serial communication to convert the digital image signal into a parallel signal, and outputs the parallel signal to the first image processing section 32.

The first image processing section 32 includes a pixel defect correction section 34, a binning processing section 35, a blend processing section 36, and a binning brightness detection section 37.

The pixel defect correction section 34 performs processing of interpolating a pixel signal from a defective pixel in an image signal on the basis of pixel signals of normal pixels in a vicinity of the defective pixel. Here, the control section 48 acquires a defective pixel address of the image pickup device 15 which is stored in the memory 23, and controls the pixel defect correction section 34 so as to correct the pixel signal of the acquired defective pixel.

When a defective pixel is present, if binning processing is performed directly with use of the pixel signal obtained from the defective pixel, a generated binning pixel signal takes over an influence of the defective pixel to be a signal of an improper level, and becomes a cause of image quality degradation. Thus, as shown in FIG. 1, the pixel defect correction section 34 is disposed at a preceding stage to the binning processing section 35, so that a pixel defect is in a state already corrected when binning processing is performed.

The binning brightness detection section 37 detects brightness of the image after pixel defect correction at each region (a region composed of a set of pixels which are objects to be added up to be one pixel after processing, by binning processing in the binning processing section 35). More specifically, when the region is composed of 2 by 2 pixels as in an example which will be described as follows, the binning brightness detection section 37 calculates the brightness of the region from an average value, a median value or the like on the basis of a plurality of pixel signals (pixel signals of 2 by 2 pixels) belonging to the region. The brightness detected by the binning brightness detection section 37 is outputted to the blend processing section 36 and the control section 48.

The binning processing section 35 is an image processing binning processing section that performs binning processing of a plurality of pixel signals outputted from the endoscope 2 as a part of image processing. That is, the binning processing section 35 splits an image after pixel defect correction, which is configured by a plurality of pixel signals, into a plurality of regions so that one region includes a plurality of pixel signals, and performs binning processing of adding up the plurality of pixel signals belonging to the region to obtain a binning pixel signal. More specifically, the binning processing section 35 adds up pixel signals for each region of 2 by 2 pixels, for example (or a region of 3 by 3 pixels, a region of 4 by 4 pixels or the like may be adopted, a non-square region may be adopted, or a size of the region may be suitably changed in accordance with the brightness of the image), and performs binning processing. Here, when it is determined that a color filter is provided in the light receiving section 17 on the basis of the individual information stored in the memory 23, arrangement of the color filter is taken into consideration, and pixel signals are added up for pixels of each of same colors.

The blend processing section 36 is a compositing section configured to generate a composite image by performing processing of setting a weight a in the region, on the basis of the brightness detected by the binning brightness detection section 37, and compositing the pixel signals (pixel signals after pixel defect correction) and the binning pixel signal in the region on the basis of the weight a for the regions corresponding to one image. Here, the weight a refers to an amount indicating a ratio of signals at a time of compositing the pixel signals and the binning pixel signal, and is a local amount which differs according to the regions.

Figure 3:
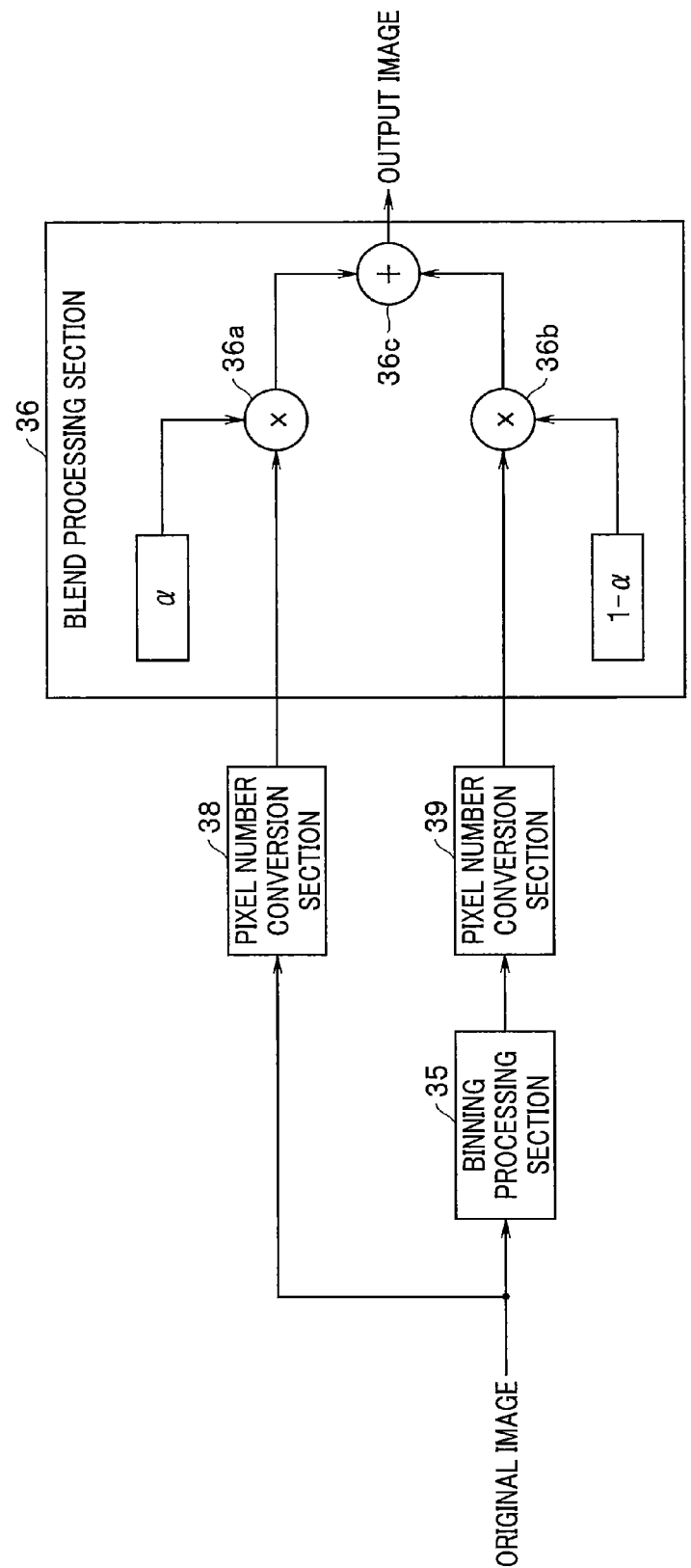
FIG. 3 is a block diagram showing a configuration example of a vicinity of a binning processing section and a blend processing section in more detail, in embodiment 1 described above.
Figures 4, 5, 6:
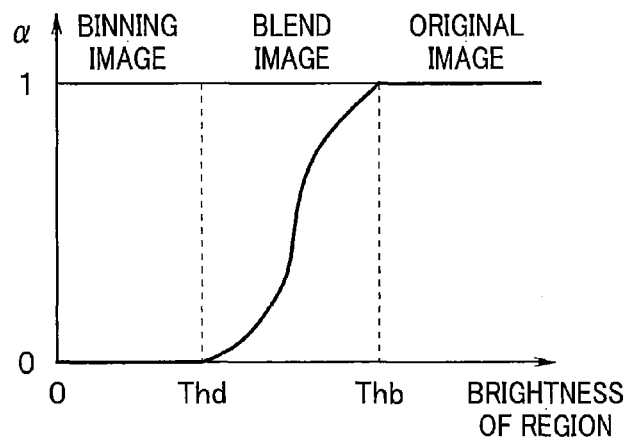
FIG. 4 is a table showing an example in which a weight a is caused to differ in accordance with brightness of a pixel in embodiment 1 described above.
FIG. 5 is a diagram showing an example of the weight a that is determined in accordance with the brightness of the pixel, in embodiment 1 described above.
FIG. 6 is a diagram showing an example of binning processing by weighted addition, in embodiment 1 described above.

Here, referring to FIG. 3 to FIG. 5, processing of the binning processing section 35 and the blend processing section 36 will be described. FIG. 3 is a block diagram showing a configuration example of a vicinity of the binning processing section 35 and the blend processing section 36 in more detail. FIG. 4 is a table showing an example in which the weight a is caused to differ in accordance with the brightness of pixels. FIG. 5 is a diagram showing an example of the weight a which is determined in accordance with the brightness of a pixel.

To the blend processing section 36, an image from the pixel defect correction section 34 (the image may be an original image with the number of pixels outputted from the image pickup device 15, or may be an image with the number of pixels reduced by being subjected to binning processing by the binning processing section 18a), and a binning image from the binning processing section 35 are inputted.

At this time, pixel number conversion is performed for the image from the pixel defect correction section 34 by a pixel number conversion section 38, and pixel number conversion is performed for the binning image from the binning processing section 35 by a pixel number conversion section 39 respectively, and the pixel numbers are converted into the same pixel number. The pixel number after conversion by the pixel number conversion sections 38 and 39 may be caused to correspond to the pixel number of the original image, may be caused to correspond to the pixel number of the binning image, may be caused to correspond to the pixel number of the display apparatus 7, or may be caused to correspond to another arbitrary pixel number.

For example, when the pixel number after conversion by the pixel number conversion sections 38 and 39 is caused to correspond to the pixel number of the original image, an advantage is provided, that image processing at the subsequent stage does not have to be changed in accordance with the pixel number, it becomes possible to apply the same processing as processing to the original image without complicating the processing, delay in processing by changing the pixel number can be prevented. Accordingly, pixel number conversion processing may be automatically executed to return to the size of the original image when binning processing is performed. Note that although the pixel number which is changed by the binning processing section 18*a* can be returned to the pixel number of the original image by the pixel number conversion section 38, and the pixel number which is changed by the binning processing section 18*a* and the binning processing section 35 can be returned to the pixel number of the original image by the pixel number conversion section 39, the pixel number conversion sections may be respectively provided in the binning processing section 18*a* and the binning processing section 35, without being limited to the disposition shown in FIG. 3.

Further, when the pixel number after conversion is caused to correspond to the binning image, the pixel number to be processed is decreased, and therefore, a load of the following image processing is reduced.

Furthermore, when the pixel number after conversion is caused to correspond to the pixel number of the display apparatus 7, an advantage is provided, that additional pixel number conversion is not required in a following processing route to the display apparatus 7.

On the basis of the brightness of the region detected by the binning brightness detection section 37, the blend processing section 36 sets the weight a in the region. As shown in FIG. 4, the weight a is determined so that the weight a takes a larger value as the brightness of the region is brighter, and takes a smaller value as the brightness of the region is darker.

More specifically, as shown in FIG. 5, for example, the blend processing section 36 sets the weight a so that the weight a is zero when the brightness of the region is less than a predetermined lower limit threshold value Thd, the weight a monotonously increases in accordance with the brightness of the region when the brightness of the region is the lower limit value Thd or more and is less than a predetermined upper limit threshold value Thb, and the weight a is one, when the brightness of the region is the upper limit threshold value Thb or more.

Subsequently, the blend processing section 36 multiplies the pixel signals from the pixel number conversion section 38 by the weight a by a multiplication section 36*a*, multiplies the binning pixel signals from the pixel number conversion section 39 by a weight (1−α) by a multiplication section 36*b*, and adds up the pixel signals for each corresponding region by an addition section 36*c* to generate a composite image to output the composite image. Accordingly, when the pixel signals from the pixel number conversion section 38 are set as A, and the binning pixel signal from the pixel number conversion section 39 is set as B, the pixel signal outputted from the blend processing section 36 is α×A+(1−α)×B.

The processing as above is performed, whereby a ratio of the pixel signals and the binning pixel signal is 0:1 (that is only a binning image) when the brightness is less than the lower limit threshold value Thd, the ratio is α:(1−α) (that is, a blend image of the binning image and the original image, for example) when the brightness is the lower limit threshold value Thd or more and is less than the upper limit threshold value Thb, and the ratio is 1:0 (that is, only the original image, for example) when the brightness is the upper threshold value Thb or more.

The weight a which is set by the blend processing section 36 in this way is set so that as the brightness of the region becomes darker, the ratio of the binning pixel signal to the pixel signals monotonously increases to be larger.

Note that in the above description, the binning processing section 35 is assumed to simply add the pixel values of all the pixels included in the region of 2 by 2 pixels, for example, and obtain the pixel value of the binning pixel. More specifically, a case is assumed, where the pixel value obtained by the binning processing is (a+b+c+d) when the pixel values of 2 by 2 pixels are respectively a, b, c and d. However, instead of the above, weighed addition, for example, may be performed.

FIG. 6 is a diagram showing an example of binning processing by weighted addition.

The binning processing section 35 may find (axx+bxy+cxz+dxt) as the pixel value obtained by binning processing, where in the region of 2 by 2 pixels, a pixel value in coordinates (2n+1, 2m+1) is a and a weight is x, a pixel value in coordinates (2n+1, 2m+2) is b and a weight is y, a pixel value in coordinates (2n+2, 2m+1) is c and a weight is z, and a pixel value in coordinates (2n+2, 2m+2) is d and a weight is t, when m and n are integers.

Figure 7:
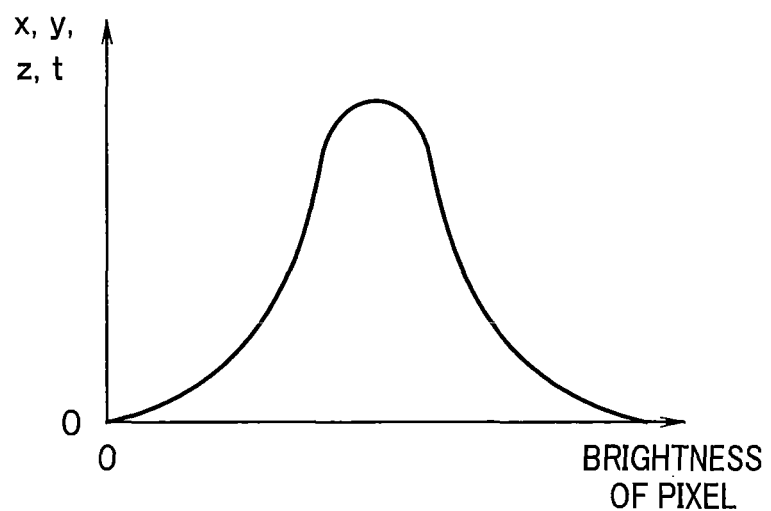
FIG. 7 is a diagram showing an example of setting addition weights x, y, z and t at a time of binning processing in accordance with brightness of a pixel, in embodiment 1 described above.

Here, as the addition weights x, y, z and t at the time of binning processing, desired fixed values may be used, but the addition weights may be changed as appropriate. FIG. 7 is a diagram showing an example in which the addition weights x, y, z and t at the time of binning processing are set in accordance with the brightness of pixels.

FIG. 7 is a setting example in which the weights are set to be smaller when the brightness of the pixels is bright and dark, as compared with a case where the brightness is medium.

When the addition weights x, y, z and t at the time of binning processing are set in this way, contribution in the binning addition, of the pixels which are much brighter than the other pixels or pixels which are much darker than the other pixels in the pixels included in the region of 2 by 2 pixels becomes small. Accordingly, influences of whiteout pixels and black crushing pixels can be reduced from the result which is obtained by binning processing.

Returning to explanation of FIG. 1, the second image processing section 33 generates the image displayed by the display apparatus 7 from the image signal outputted from the first image processing section 32.

Figure 2:
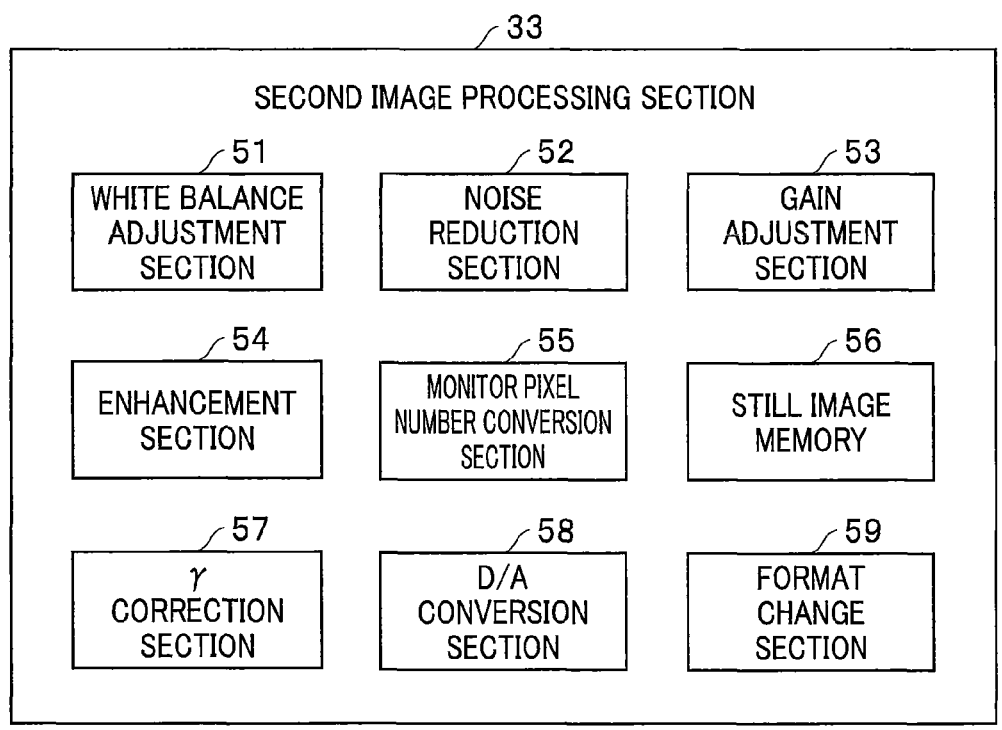
FIG. 2 is a block diagram showing a configuration example of a second image processing section in embodiment 1 described above.

FIG. 2 is a block diagram showing a configuration example of the second image processing section 33.

The second image processing section 33 includes, for example, a white balance adjustment section 51, a noise reduction section 52, a gain adjustment section 53, an enhancement section 54, a monitor pixel number conversion section 55, a still image memory 56, a γ (gamma) correction section 57, a D/A conversion section 58 and a format change section 59.

The white balance adjustment section 51 adjusts a white balance by adjusting gains of respective RGB color components configuring an image signal. Here, two kinds of white balance adjustment by the white balance adjustment section 51 are present. One is basic white balance adjustment processing which is performed when the endoscope 2 and the image processing apparatus 4 are combined for the first time (or each time the endoscope system 1 is actuated), and the other is auto white balance adjustment processing of automatically performing white balance adjustment at any time during movie image pickup.

When the basic white balance adjustment processing is performed, it is not desirable to add up pixel values which are read from different readout channels of the image pickup device 15 and differ from each other in dark current noise level, and therefore, in order to acquire the signal value which does not go through binning processing, the control section 48 forcibly turns off image pickup device binning by the binning processing section 18a and image processing binning by the binning processing section 35.

Further, when auto white balance adjustment processing is performed, both of image pickup device binning and image processing binning are desirably turned off forcibly. Note that since white balance adjustment is not always performed for an entire image, but is considered to be performed for a specific region in the image, binning processing is forcibly turned off, whereby the advantage is brought about, that an address indicating a pixel position of the specific region can be prevented from being deviated.

The noise reduction section 52 reduces a dark current noise component from an image signal. Here, in the image pickup device 15, an OB (optical black) region which is optically shielded from light is provided, besides a region irradiated with an object light from the optical system 13. Since a dark current noise component is acquired from a signal read from the OB region, the control section 48 forcibly turns off image pickup device binning by the binning processing section 18a and image processing binning by the binning processing section 35, for the readout signals from the OB region.

When the endoscope 2 and the image processing apparatus 4 are connected in the first combination, the image processing apparatus 4 causes the memory 23 of the endoscope 2 to store the dark current noise information which is acquired from the OB region in a state where both of the image pickup device binning and the image processing binning are turned off, as scope individual information. In this way, acquisition processing of the dark current noise information is executed when the image processing apparatus 4 and the endoscope 2 are combined for the first time (that is, each time a new combination arises). Once the dark current noise information is acquired, processing of removing the dark current noise is performed by reading the dark current noise information stored in the memory 23 thereafter.

Note that the example in which the noise reduction section 52 is provided in the second image processing section 33 is shown here, but the noise reduction section 52 is not limited to the disposition, and as long as the disposition is after the S/P conversion section 31, the noise reduction section 52 may be disposed any place on a transmission system path for the image signal which is outputted to the display apparatus 7 (however, when noise reduction is performed by digital processing, the noise reduction section 52 needs to be disposed to be anterior to the D/A conversion section 58).

The gain adjustment section 53 performs amplification of an image signal on the basis of a gain adjustment value received from the control section 48.

The enhancement section 54 performs enhancement processing such as edge enhancement of an image.

The monitor pixel number conversion section 55 converts the pixel number of an image into a pixel number for display in the display apparatus 7.

The still image memory 56 stores an image signal for still image display. A freeze button or the like is provided in the endoscope 2, and when the freeze button is operated, the image signal for still image display stored in the still image memory 56 is displayed in the display apparatus 7. When the freeze button is not operated, the image processing apparatus 4 generates a movie and the movie is displayed in the display apparatus 7.

The γ correction section 57 performs gray level correction (γ correction) of an image signal in response to display characteristics of the display apparatus 7.

The D/A conversion section 58 converts the image signal subjected to gray level correction by the γ correction section 57 into an analog signal.

The format change section 59 changes the image signal converted into the analog signal to a signal format corresponding to the display apparatus 7 and outputs the image signal.

Returning to the explanation of FIG. 1, the readout address setting section 41 sets readout addresses of pixels which are read from the image pickup device 15, in accordance with a predetermined readout sequence. Here, the readout addresses set here are outputted to the drive signal generation section 42, and are outputted to the first image processing section 32 in order to perform signal processing corresponding to the readout sequence.

The drive signal generation section 42 generates a timing signal for driving the image pickup section 14 on the basis of the readout address received from the readout address setting section 41 and a reference clock signal received from the reference clock generation section 45, and transmits the timing signal to the timing generator 22 of the endoscope 2.

The brightness detection section 43 detects brightness of the image outputted from the first image processing section 32 for the purpose of light adjustment. Here, when binning processing is performed, brightness of an image changes, and therefore, the image detected by the brightness detection section 43 is an image after binning processing (further, after composite). The brightness detection section 43 calculates a gain adjustment value and a light irradiation amount on the basis of the detected brightness, outputs the gain adjustment value to the gain adjustment section 53 via the control section 48, and outputs the light irradiation amount to the light adjustment section 44.

The light adjustment section 44 sets a kind, a basic light amount, a light emitting timing and the like of light generated by the light source apparatus 6 under control of the control section 48 corresponding to an observation mode, and further adjusts the basic light amount on the basis of the light irradiation amount received from the brightness detection section 43 to set the light amount after adjustment, and transmits a light source synchronizing signal including the set conditions to the light source apparatus 6.

The reference clock generation section 45 generates a reference clock signal to be a reference of operation timing of the endoscope system 1 and supplies the reference clock signal to the respective sections.

The input section 46 is configured by having various operation switches, a touch panel and the like, and receives an operation input instructing an operation of the endoscope system 1.

The storage section 47 is configured by using a semiconductor memory such as a flash memory, and a DRAM (dynamic random access memory), and stores various processing programs for operating the endoscope system 1, and data including various parameters necessary for operation of the endoscope system 1.

The control section 48 is configured by using a CPU (central processing unit) and the like, and generally controls the respective sections of the endoscope system 1 including the image processing apparatus 4. For example, the control section 48 transmits set data for image pickup control to the image pickup control section 24 of the endoscope 2. Further, the control section 48 controls the first image processing section 32, and only when the pixel number of the photoelectric conversion pixels read from the memory 23 is a predetermined threshold value or more, the control section 48 allows operations of the binning processing section 35 (or further, the binning processing section 18*a*), the binning brightness detection section 37 and the blend processing section 36.

Next, the light source apparatus 6 includes a white color light source 61, a special light light source 62, a light source control section 63, and an LED (light emitting diode) driver 64. Note that in the case of the above described frame-sequential method, a filter that transmits lights of R, G and B sequentially from illuminating light emitted from the white color light source 61 may be provided. Further, the light source apparatus 6 may obtain a white color light by causing single color LEDs of R, G and B to emit lights simultaneously, or may obtain illumination of the frame-sequential method by causing single color LEDs of R, G and B to emit lights sequentially.

The white color light source 61 includes an LED, for example, as a light source, and emits white color illuminating light.

The special light light source 62 also includes an LED, for example, as a light source, and emits special light differing in wavelength band from the white color illuminating light. Here, as a special light generated by the special light light source 62, AFI (fluorescence observation: auto fluorescence imaging) illuminating light including excitation light (390 to 470 nm) for observing auto fluorescence from a fluorescent substance such as collagen and light of a wavelength (540 to 560 nm) absorbed by hemoglobin in blood, NBI (narrow band light observation: narrow band imaging) illuminating light including blue color light and green color light with bands narrowed to be easily absorbed by hemoglobin in blood, IRI (infrared light observation: infra red imaging) illuminating light including two infrared lights (790 to 820 nm/905 to 970 nm) that are irradiated to a subject to which ICG (indocyanine green) easily absorbing infrared light is injected, and the like are cited as several examples. AFI among them has high necessity to be combined with the technique of increasing brightness of an image, because the light obtained as auto fluorescence is extremely feeble light.

The light source control section 63 controls a current amount which is supplied to the white color light source 61 or the special light light source 62 from the LED driver 64 in accordance with the light source synchronizing signal transmitted from the light adjustment section 44.

The LED driver 64 supplies a current to the white color light source 61 or the special light light source 62 to cause the white color light source 61 or the special light light source 62 to generate light, on the basis of control of the light source control section 63. The light generated by the white color light source 61 or the special light light source 62 in this way is transmitted via the light guide 11, and is irradiated toward the subject from the distal end of the insertion portion of the endoscope 2.

The display apparatus 7 displays the image outputted from the image processing apparatus 4.

Figures 8, 9:
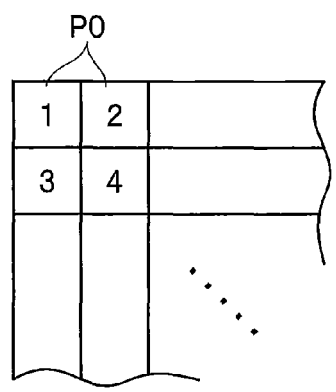
FIG. 8 is a diagram showing a control example of noise reduction processing and enhancement processing following on/off of binning processing, in embodiment 1 described above.
FIG. 9 is a diagram showing an array of photoelectric conversion pixels in embodiment 1 described above.

Next, FIG. 8 is a diagram showing a control example of the noise reduction processing and the enhancement processing following on/off of binning processing.

In the aforementioned processing, when the brightness is the upper limit threshold value Thb or more, processing that is practically equivalent to the binning processing being automatically turned off is performed because the image outputted from the blend processing section 36 is only the image (for example, an original image) from the pixel defect correction section 34, and in contrast, when the brightness is less than the upper limit threshold value Thb, processing that is practically equivalent to binning processing being automatically turned on is performed.

Thus, the processing load may be reduced and power consumption may be reduced by actually switching on/off of binning processing automatically in accordance with whether the brightness is less than, or equal to or more than the upper limit threshold value Thb.

In both of a case where binning processing is practically turned on/off, and a case where binning processing is actually turned on/off, noise reduction processing by the noise reduction section 52 and enhancement processing by the enhancement section 54 can be controlled as shown in FIG. 8.

That is, if noise reduction processing and enhancement processing which are performed when binning processing is off are normal processing, noise reduction processing can be weakened and enhancement processing can be strengthened when binning processing is on. That is, since an image is smoothened when binning processing is performed, noise reduction processing is weakened so that smoothing is not performed excessively, and enhancement processing is strengthened so that details do not get blurred. Thereby, even when binning processing is performed, the structure of the subject can be observed more clearly.

Note that in the configuration example shown in FIG. 1, binning processing and blend processing are performed in the image processing apparatus 4, and only binning processing is performed in the image pickup section 14, but a configuration in which blend processing may be further performed in the image pickup section 14 may be adopted. When blend processing in the image pickup section 14 is performed, as for the brightness of the respective regions (for example, 2 by 2 pixels) of the image used to determine the weight a, the brightness acquired for the image of an immediately preceding frame can be used (that is, feedback processing can be performed).

Figure 10:
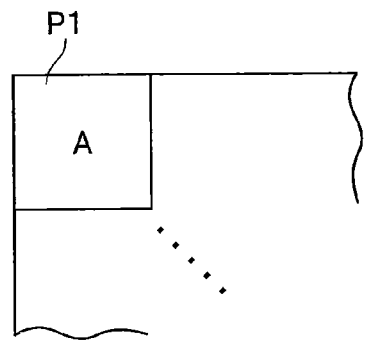
FIG. 10 is a diagram showing a pixel obtained by four photoelectric conversion pixels being added by image pickup device binning, in embodiment 1 described above.
Figure 11:
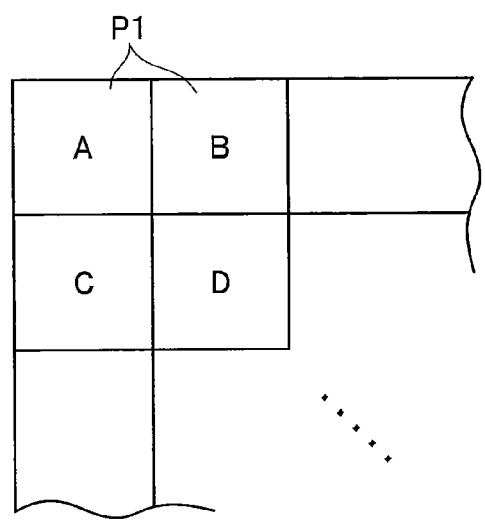
FIG. 11 is a diagram showing an array of binning pixels after image pickup device binning, in embodiment 1 described above.
Figure 12:
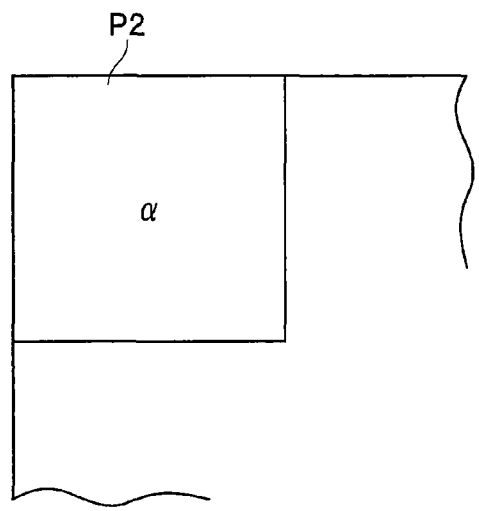
FIG. 12 is a diagram showing a pixel obtained by four binning pixels after image pickup device binning being added by image processing binning, in embodiment 1 described above.

Further, in the configuration shown in FIG. 1, two kinds of binning are present, that are image pickup device binning by the binning processing section 18*a* of the image pickup device 15, and image processing binning by the binning processing section 35 of the image processing apparatus 4, and on/off of the binning processing sections 18*a* and 35 are controllable individually, for example. A state of pixel addition at a time of binning processing by the binning processing sections 18*a* and 35 being performed is as shown in FIG. 9 to FIG. 12. Here, FIG. 9 is a diagram showing an array of photoelectric conversion pixels. FIG. 10 is a diagram showing a pixel obtained by four photoelectric conversion pixels being added by image pickup device binning. FIG. 11 is a diagram showing an array of binning pixels after image pickup device binning. FIG. 12 is a diagram showing a pixel obtained by four binning pixels after image pickup device binning being added by image processing binning.

First, in the array of photoelectric conversion pixels P0 that are obtained by photoelectric conversion performed by the light receiving section 17, when the pixels P0 shown by 1 to 4 in FIG. 9 are added up by image pickup device binning, a pixel P1 shown by A in FIG. 10 is obtained. Furthermore, image pickup device binning is also performed similarly for pixels in a vicinity of the pixel P1 in A in FIG. 10, and pixels P1 by A to D in FIG. 11 are assumed to be obtained. At this time, when the pixels P1 by A to D in FIG. 11 are added up by image processing binning, a pixel P2 shown by β in FIG. 12 is obtained. Note that when a color filter is provided in the light receiving section 17, addition of four pixels is performed among pixels of each of the same colors.

In the example shown in FIG. 9 to FIG. 12, fourfold sensitivity is obtained by image pickup device binning, and fourfold sensitivity is obtained similarly by image processing binning, so that sixteen-fold sensitively is obtained when both binning processing are performed.

Figure 13:
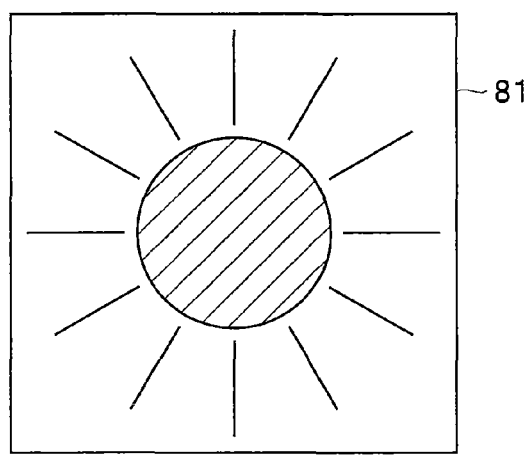
FIG. 13 is a diagram showing an image example at a time of an application site being a lung, in embodiment 1 described above.
Figures 14, 15:
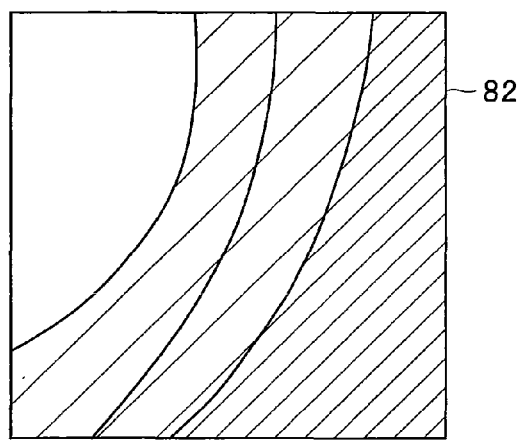
FIG. 14 is a diagram showing an image example at a time of an application site being a stomach, in embodiment 1 described above.
FIG. 15 is a table showing an example of proper use of image pickup device binning and image processing binning corresponding to application sites, in embodiment 1 described above.

However, an example of proper use of image pickup device binning and image processing binning will be described here, because sixteen-fold sensitivity is not always required at the time of actual use. FIG. 13 is a diagram showing an image example at a time of an application site being a lung. FIG. 14 is a diagram showing an image example at a time of the application site being a stomach. FIG. 15 is a table showing an example of proper use of image pickup device binning and image processing binning corresponding to the application sites.

An example of an image 81 that is obtained when the application site is a lung is an example in which a dark portion which illuminating light does not reach sufficiently is taken in a central portion in a narrow tube cavity as shown in FIG. 13, and a relatively sufficient light amount is obtained except for the central portion.

In the case of FIG. 13, it is conceivable that image processing binning is made unnecessary to be turned off, for example, and only image pickup device binning is appropriately used as shown in a middle tier in FIG. 15.

In contrast, an example of an image 82 that is obtained when the application site is a stomach is an example in which an internal space of the stomach is large because the stomach is in a swelled state by air feeding or the like being performed, and illuminating light reaches an inner wall of the stomach with low illuminance so that a dark portion is taken in a relatively large area as shown in FIG. 14, and a light amount is entirely insufficient.

In the case of FIG. 14, it is conceivable to use image pickup device binning as indispensable, and further image processing binning is made necessary appropriately, as shown in a lower tier in FIG. 15.

As described above, the information indicating the model name of the endoscope 2 is stored in the memory 23 of the endoscope 2 as scope individual information. Thus, whether the application site is a lung, a stomach, another site or the like is determined in accordance with the model name of the endoscope 2, and on the basis of a determination result, image pickup device binning and image processing binning can be set to be automatically used as appropriate.

In this way, the control section 48 controls on/off of the binning processing section 18a and on/off of the binning processing section 35 in accordance with the scope individual information. Binning processing is properly used in accordance with the application site, whereby reduction in image resolution as in the case where both of image pickup device binning and image processing binning are always performed can be appropriately prevented.

Note that in the example shown in FIG. 15, image pickup device binning is more preferentially used than image processing binning, but the present invention is not limited to this, and image processing binning may be used more preferentially than image pickup device binning.

Here, when image pickup device binning is preferentially used, pixel addition can be performed by analog addition, and therefore an advantage of being able to reduce a magnitude of random noise to $1/\sqrt{N}$-fold, for example, where the number of added pixels is set as N is obtained. Further, the pixel number read from the image pickup device 15 becomes small, and therefore high-speed readout is enabled. Further, since the number of pixels is small, an advantage that the load of processing in the subsequent stage, that is, processing in the analog front end section 16 and the image processing apparatus 4 is light is also provided.

When image processing binning is preferentially used, an advantage that a degree of freedom of processing is high, such as enabling addition pixel number (2 by 2 pixels, 3 by 3 pixels, 4 by 4 pixels, . . . ) in binning processing to be variable is provided.

Incidentally, the brightness detection section 43 that detects brightness of an image to perform light adjustment does not always detect average brightness of an entire image, but performs brightness detection with importance being attached to brightness in a central portion of an image, or brightness detection with importance being attached to brightness of a specific portion of the image, for example. The brightness detection section 43 detects the brightness of the image which is outputted from the first image processing section 32, that is, the brightness of the image after binning processing (furthermore, after blend processing), as described above.

Detection of brightness of a central portion, a specific portion or the like at this time is performed by designating an address in the pixel array of the image, but when binning processing is performed, the pixel number changes, and therefore the address before binning processing cannot be directly used. Thus, in accordance with presence or absence of binning processing, the brightness detection section 43 adjusts the size and address of the region the brightness of which is detected.

Figures 16, 17:
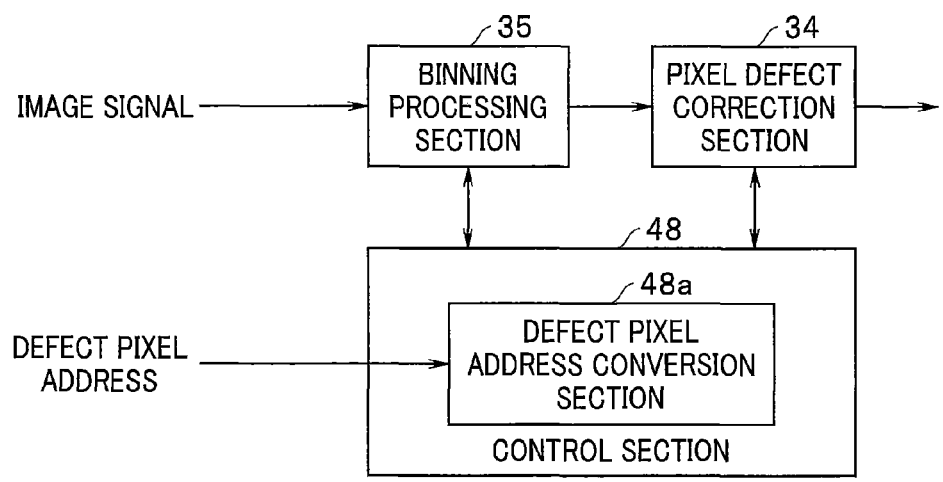
FIG. 16 is a table showing a state of change of brightness detection region size according to presence or absence of image pickup device binning and image processing binning, in embodiment 1 described above.
FIG. 17 is a block diagram showing a configuration example in which a pixel defect correction section is disposed at a subsequent stage of the binning processing section, in embodiment 1 described above.

FIG. 16 is a table showing a state of change of the size of the brightness detection region corresponding to presence and absence of image pickup device binning and image processing binning.

As illustrated, change of the address and the size of the detection region by the brightness detection section 43 is performed without fail when at least one of image pickup device binning and image processing binning is carried out.

More specifically, a case where a start address of a detection region at a time of no binning processing being performed is (x, y), a detection region size is (a, b), image pickup device binning is 2 by 2 pixels addition, and image processing binning is also 2 by 2 pixels addition is considered. At this time, when only one of image pickup device binning and image processing binning is performed, the start address is (x/2, y/2) and the detection region size is (a/2, b/2). Further, when both of image pickup device binning and image processing binning are performed, the start address is (x/4, y/4) and the detection region size is (a/4, b/4).

Processing like this is performed, whereby even when binning processing is executed, precision reduction can be prevented at a time of small halation of a treatment instrument being detected, for example, and it becomes possible to perform light adjustment control with precision similar to precision in a case where binning processing is not executed.

Note that the start address and the region size of the detection region like this are not limited to being obtained by calculating at each implementation, but may be stored in the memory 23 or the storage section 47, for example, in advance as parameters, and the control section 48 may read appropriate parameters from the memory 23 or the storage section 47 in accordance with the kind of binning which is set and set the parameters to the light adjustment section 44.

Further, as light adjustment parameters that are preferably changed besides the region size of the brightness detection section 43 because an image becomes bright when binning processing is performed, a threshold value of brightness determination in the brightness detection section 43, a gain of the gain adjustment section 53 and the like are cited.

FIG. 17 is a block diagram showing a configuration example in which the pixel defect correction section 34 is disposed at a subsequent stage of the binning processing section 35.

As described above, the pixel defect correction section 34 is preferably disposed in the preceding stage to the binning processing section 35 so that the influence of a defective pixel is not exerted on binning pixels, and FIG. 1 shows the configuration example. However, a case is conceivable, in which the pixel defect correction section 34 is disposed in the subsequent stage of the binning processing section 35, as shown in FIG. 17, for a certain reason in configuration.

In this case, the control section 48 is caused to include the function of the defective pixel address conversion section 48a, and converts the defective pixel address read from the memory 23 into an address corresponding to the address after binning processing when binning processing is on, and can cause the pixel defect correction section 34 to perform pixel defect correction processing by the address after conversion.

Further, when the readout section 18 functions as the binning processing section 18a, that is, when the pixel signal received by the pixel defect correction section 34 is a binning pixel signal which has already gone through binning processing, the control section 48 similarly controls the pixel defect correction section 34 after converting the defective pixel address which is read out from the memory 23 into the address after binning processing.

Note that when on/off of binning processing is switched in accordance with the brightness of an image, an image signal of an object that is irradiated with an emission light amount adjusted by the light adjustment section 44 in a state where binning processing is turned off is acquired first, binning processing is set at off when brightness of the acquired image signal is bright, and when the brightness is dark, binning processing is set at on.

According to embodiment 1 as above, an image (for example, an original image) and a binning image are composited (blend processing) at each region in accordance with the brightness of the region, and therefore, reduction in resolution can be restricted more than in the case of only the binning image. Since the composite ratio of the image (for example, the original image) and the binning image is changed in accordance with the brightness of the region, for example, the region without binning and the 2 by 2 pixel binning region are not switched in a step manner (discontinuously), but boundary regions are smoothly connected. Therefore, unnaturalness of the image is reduced, and a more natural image can be obtained.

Further, for the bright region, since an original image or the like is used, resolution can be retained.

When the pixel defect correction section 34 is disposed in the preceding stage of the binning processing section 35 as shown in FIG. 1, the influence which the influence of the defective pixel exerts on the pixels after binning can be reduced in advance, and a proper image with degradation of image quality being restricted can be obtained.

In addition, the binning processing sections 18a and 35 can be properly controlled in accordance with the scope individual information. More specifically, binning processing is allowed only when the number of pixels of the image pickup section 14 is a predetermined threshold value or more, whereby substantial reduction in the image resolution can be prevented. Further, the binning processing section 18a and the binning processing section 35 can be properly used in accordance with the model name of the endoscope 2.

Note that in the above description, the image pickup apparatus is mainly explained, but the present invention may be an operation method of the image pickup apparatus, a processing program for causing a computer to execute the operation method of the image pickup apparatus, a computer-readable non-temporary recording medium recording the processing program or the like.

Further, the present invention is not limited to the aforementioned embodiment as it is, but can be embodied with the components modified within the range without departing from the gist of the present invention in an implementation stage. Further, various aspects of the invention can be formed by appropriate combination of a plurality of components disclosed in the above described embodiment. For example, several components may be removed from all the components shown in the embodiment. Further, the components throughout different embodiments may be appropriately combined. It is needless to say that various modifications and applications are enabled in the range without departing from the gist of the invention in this way.

What is claimed is:

1. An image pickup apparatus, comprising:
   an endoscope configured to have an image pickup section in which a plurality of photoelectric conversion pixels that photoelectrically convert light to generate photoelectric conversion pixel signals are two-dimensionally provided, and an individual information storage section configured to store scope individual information;
   a binning processing section configured to split an image configured by the pixel signals in plurality into a plurality of regions so that one region includes the pixel signals in plurality, and add up the pixel signals in plurality which belong to the region to obtain a binning pixel signal;
   a binning brightness detection section configured to detect brightness of the region;
   a compositing section configured to set a weight in the region on the basis of the brightness which is detected by the binning brightness detection section, and generate a composite image by compositing the pixel signals and the binning pixel signal in the region on the basis of the weight; and
   a control section configured to control the binning processing section in accordance with the scope individual information.

2. The image pickup apparatus according to claim 1, wherein the compositing section sets the weight so that as the brightness becomes darker, a ratio of the binning pixel signal to the pixel signal monotonously increases to be larger.

3. The image pickup apparatus according to claim 2, wherein the compositing section further sets the weight so that the ratio of the pixel signal and the binning pixel signal becomes 0:1 when the brightness is less than a predetermined lower limit threshold value, and becomes 1:0 when the brightness is a predetermined upper limit threshold value or more.

4. The image pickup apparatus according to claim 1, wherein the scope individual information includes a pixel number that is a number of the photoelectric conversion pixels provided in the image pickup section, and the control section further controls the binning brightness detection section and the compositing section, and allows operations of the binning processing section, the binning brightness detection section and the compositing section only when the pixel number is a predetermined threshold value or more.

5. The image pickup apparatus according to claim 1, wherein the binning processing section includes an image pickup device binning processing section configured to perform binning processing of the photoelectric conversion pixel signals in the image pickup section, and an image processing binning processing section configured to perform binning processing of the pixel signals in plurality outputted from the endoscope as a part of image processing, and the control section controls on/off of the image pickup device binning processing section, and on/off of the image processing binning processing section, in accordance with the scope individual information.

6. An image pickup apparatus, comprising:
an endoscope comprising:
    an image sensor comprising a plurality of photoelectric conversion pixels configured to photoelectrically convert light to generate photoelectric conversion pixel signals, wherein the plurality of photoelectric conversion pixels are two-dimensionally provided; and
    an individual information storage configured to store scope individual information; and
a processor comprising hardware, wherein the processor is configured to:
    perform a binning process comprising:
        splitting an image configured by the pixel signals in plurality into a plurality of regions so that one region includes the pixel signals in plurality, and adding up the pixel signals in plurality which belong to the region to obtain a binning pixel signal;
    detect brightness of the one region;
    set a weight in the one region on the basis of the brightness which is detected, and generate a composite image by compositing the pixel signals and the binning pixel signal in the region on the basis of the weight; and
    control the binning process in accordance with the scope individual information.

7. An image processing apparatus for processing photoelectric conversion pixels signals generated through photoelectric conversion of light by a plurality of photoelectric conversion pixels of an image sensor of an endoscope, wherein the plurality of photoelectric conversion pixels are two-dimensionally provided,
wherein the image processing apparatus comprises:
    a processor comprising hardware, wherein the processor is configured to:
        perform a binning process comprising:
            splitting an image configured by the pixel signals in plurality into a plurality of regions so that one region includes the pixel signals in plurality; and
            adding up the pixel signals in plurality which belong to the region to obtain a binning pixel signal;
        detect brightness of the one region;
        set a weight in the one region on the basis of the brightness which is detected, and generate a composite image by compositing the pixel signals and the binning pixel signal in the region on the basis of the weight; and
        control the binning process in accordance with scope individual information regarding characteristics of the endoscope.

8. A non-transitory computer-readable storage device storing instructions for processing photoelectric conversion pixels signals generated through photoelectric conversion of light by a plurality of photoelectric conversion pixels of an image sensor of an endoscope, wherein the plurality of photoelectric conversion pixels are two-dimensionally provided, wherein the instructions, when executed by processor causes the processor to:
    perform a binning process comprising:
        splitting an image configured by the pixel signals in plurality into a plurality of regions so that one region includes the pixel signals in plurality; and
        adding up the pixel signals in plurality which belong to the region to obtain a binning pixel signal;
    detect brightness of the one region;
    set a weight in the one region on the basis of the brightness which is detected, and generate a composite image by compositing the pixel signals and the binning pixel signal in the region on the basis of the weight; and
    control the binning process in accordance with scope individual information regarding characteristics of the endoscope.

* * * * *